(No Model.)
W. BURKET.
DEVICE FOR EXCAVATING AND MOVING DIRT, &c.
No. 277,455. Patented May 15, 1883.
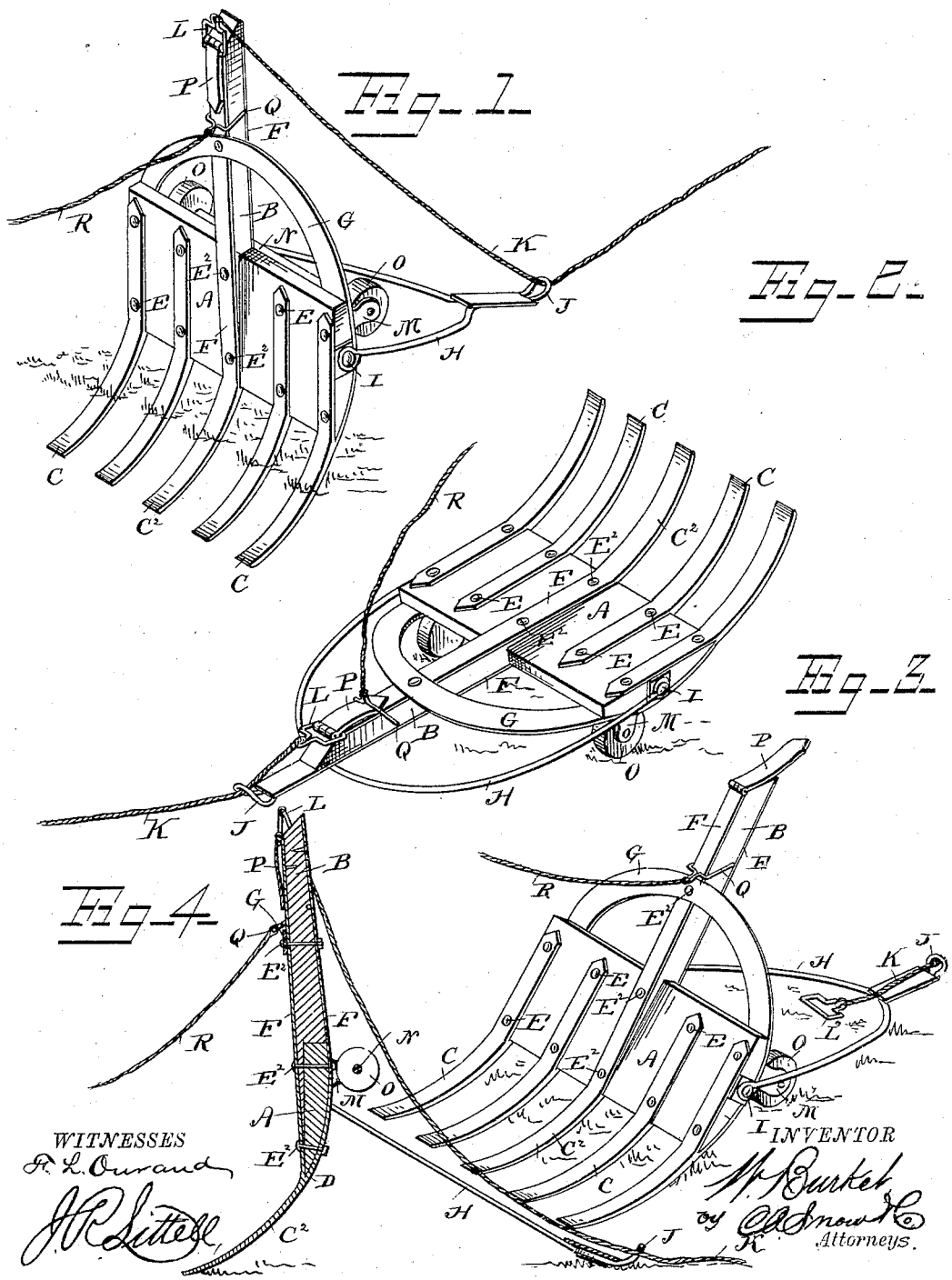
WITNESSES
INVENTOR
Attorneys.

UNITED STATES PATENT OFFICE.

WILLIAM BURKET, OF ETNA GREEN, INDIANA.

DEVICE FOR EXCAVATING AND MOVING DIRT, &c.

SPECIFICATION forming part of Letters Patent No. 277,455, dated May 15, 1883.

Application filed January 31, 1883. (No model.)

*To all whom it may concern:*

Be it known that I, WILLIAM BURKET, a citizen of the United States, residing at Etna Green, in the county of Kosciusko and State of Indiana, have invented a new and useful Device for Excavating and Moving Dirt, Hay, &c., of which the following is a specification, reference being had to the accompanying drawings.

This invention relates to a new and useful device for excavating and moving dirt, stones, and the like, and for moving hay, straw, and other material; and it consists in certain improvements in the construction of the same, which will be hereinafter fully described, and particularly pointed out in the claims.

In the drawings hereto annexed, Figure 1 is a perspective view, showing the device in position for use. Fig. 2 is a perspective view, showing the same tilted as when loaded. Fig. 3 is a perspective view, showing the device tripped and in the act of dumping its load; and Fig. 4 is a vertical longitudinal sectional view, showing the device in the position shown in Fig. 1.

The same letters refer to the same parts in all the figures.

A in the drawings designates a platform forming the body of my improved machine, which said platform is provided with a forwardly or upwardly projecting lever or handle, B. At its lower or rear end the platform A is provided with teeth or prongs C C, which are curved, as shown, and which are forked at their inner ends, as at D, so as to embrace the platform, to which they are secured by bolts E, passing through the latter. The tines F F of the central tooth, which is distinguished by the letter $C^2$, extend over and under the lever B, to which they are secured by bolts $E^2$, and which is thereby braced and strengthened. The lever B is also connected with the platform A by a curved brace, G.

H is a bail, the ends of the arms of which are pivoted to the sides of the platform A at I I. The upper or outer end of the bail H has a ring or eye, J, through which passes the draft-rope K, carrying at its inner end a ring or link, L. The under side of the platform is provided in front of the pivoting-points I of the bail with brackets M, forming bearings for an axle, N, mounted upon wheels O.

To the lever B, near the front end of the latter, is hinged a tongue, P, rear of which is pivoted a bail, Q, to which the trip-rope R is attached, as shown.

In operation, the lever B is first raised to a vertical position, as shown in Fig. 1, and the teeth or prongs are then pressed into the ground or into the hay or other material to be moved. The tongue P is then passed through the link at the end of the draft-rope and locked under the trip-bail Q, after which the draft-rope is passed through the ring or eye J at the end of the bail H. The latter remains in a horizontal or nearly horizontal position upon the ground. When draft is applied the lever B is tilted, thus prying out the load, which drops over upon the platform or body, resting partly upon the latter and partly upon the teeth or prongs. When in this position the device rests upon the wheels O, and the load may thus be conveniently moved to any desired place. When the dumping-place has been reached the trip-rope is drawn, thus releasing the hinged tongue P from the bail Q. The pressure of the load upon the curved teeth or prongs will then tilt the device, and thus cause the load to be dumped.

I claim as my invention and desire to secure by Letters Patent of the United States—

1. The combination, with the platform or body having a forwardly-extending lever, of the teeth or prongs, forked so as to embrace the said platform and lever, to which they are secured by transverse bolts, as set forth.

2. The combination, with the platform A, having lever B and curved teeth C, of the pivoted bail H, having ring or eye J, and the draft-rope K, having link L, adapted to be attached to the upper end of the lever B by suitable trip mechanism, substantially as set forth.

3. The combination of the platform A, having lever B and curved teeth C, the tongue P and bail Q, pivoted at the upper end of the lever B, the trip-rope R, attached to bail Q, and the draft-rope K, having link L, substantially as set forth.

4. The combination of the platform A, having brackets M, axle N, wheels O, lever B, and pivoted bail H, provided with the ring or eye J, with the draft-rope K, having link L, and suitable trip mechanism for connecting the said link to the upper end of the lever B, substantially as set forth.

In testimony that I claim the foregoing as my own I have hereto affixed my signature in presence of two witnesses.

WILLIAM BURKET.

Witnesses:
SAMUEL E. O'BRIEN,
PETER GANSHORN.